United States Patent
Song et al.

(10) Patent No.: US 11,873,891 B2
(45) Date of Patent: Jan. 16, 2024

(54) PLANETARY GEARBOX, ASSEMBLY METHOD THEREOF, ASSOCIATED ROBOT JOINT AND ROBOT

(71) Applicant: ABB Schweiz AG, Baden (CH)

(72) Inventors: Wei Song, Shanghai (CN); Hao Gu, Shanghai (CN); Tao Feng, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/624,560

(22) PCT Filed: Jul. 29, 2019

(86) PCT No.: PCT/CN2019/098122
§ 371 (c)(1),
(2) Date: Jan. 3, 2022

(87) PCT Pub. No.: WO2021/016783
PCT Pub. Date: Feb. 4, 2021

(65) Prior Publication Data
US 2022/0252147 A1    Aug. 11, 2022

(51) Int. Cl.
*F16H 57/08* (2006.01)
*B25J 9/10* (2006.01)

(52) U.S. Cl.
CPC ............ *F16H 57/08* (2013.01); *B25J 9/102* (2013.01)

(58) Field of Classification Search
CPC ...... B25J 9/102; F16H 2001/325; F16H 1/32; F16H 55/12; F16H 2055/175
See application file for complete search history.

(56) References Cited

U.S. PATENT DOCUMENTS

| | | | |
|---|---|---|---|
| 408,435 A | * | 8/1889 | Redington ............. F16H 55/12 74/448 |
| 1,974,514 A | * | 9/1934 | Schieferstein ...... F16H 61/6647 74/61 |

(Continued)

FOREIGN PATENT DOCUMENTS

| | | |
|---|---|---|
| CN | 101818782 A | 9/2010 |
| CN | 102849637 A | 1/2013 |

(Continued)

OTHER PUBLICATIONS

International Search Report and Written Opinion, issued by the ISA/CN National Intellectual Property Administration, regarding corresponding patent application Serial No. PCT/CN2019/098122; dated Feb. 22, 2020, 8 pages.

(Continued)

*Primary Examiner* — Sherry L Estremsky
(74) *Attorney, Agent, or Firm* — Greenberg Traurig, LLP

(57) ABSTRACT

Embodiments of the present disclosure provide a planetary gearbox. The planetary gearbox includes a housing extending along a first axis; a first coupling member arranged on an inner circumference of the housing; an input component operable to rotate about the first axis; at least one intermediate component, each intermediate component comprising a second coupling member and adapted to be driven by the input component to rotate about a second axis offset from the first axis with the second coupling member engaging with the first coupling member; and an output component coupled to the at least one intermediate component and operable to rotate about the first axis with rotation of the at least one intermediate component, wherein at least one of the first coupling member and the second coupling member comprises a synchronous belt.

23 Claims, 4 Drawing Sheets

(56) References Cited

U.S. PATENT DOCUMENTS

| | | | | |
|---|---|---|---|---|
| 2,753,731 A * | 7/1956 | McWethy | ................. | F16D 3/76 |
| | | | | 74/413 |
| 3,160,032 A * | 12/1964 | Black | ........................ | F16H 1/32 |
| | | | | 74/462 |
| 3,557,633 A * | 1/1971 | Frerichs | .................. | F16H 55/12 |
| | | | | 74/411 |
| 9,783,262 B2 * | 10/2017 | Dubose | ............... | F16H 57/0476 |
| 2012/0325040 A1 * | 12/2012 | Yamamoto | ................ | F16H 1/32 |
| | | | | 475/149 |
| 2017/0106543 A1 * | 4/2017 | Andoh | ...................... | F16H 1/32 |

FOREIGN PATENT DOCUMENTS

| | | | |
|---|---|---|---|
| CN | 103032522 A | | 4/2013 |
| CN | 103742611 A | | 4/2014 |
| CN | 104110485 A | | 10/2014 |
| CN | 104279300 B | | 3/2016 |
| CN | 108019470 A | | 5/2018 |
| CN | 109154363 A | | 1/2019 |
| EP | 2642159 A1 | | 9/2013 |
| EP | 2784347 A1 | | 10/2014 |
| GB | 329811 A | * | 5/1930 |
| WO | 2018195419 A1 | | 10/2018 |

OTHER PUBLICATIONS

China First Office Action, issued by the National Intellectual Property Administration; regarding corresponding patent application Serial No. CN 201980097867.4.; dated Jul. 29, 2022; 5/5 pages (with English translation).

* cited by examiner ial stage of International Patent
PLANETARY GEARBOX, ASSEMBLY METHOD THEREOF, ASSOCIATED ROBOT JOINT AND ROBOT

CROSS-REFERENCE TO RELATED APPLICATIONS

This application is a national stage of International Patent Application Serial No. PCT/CN2019/098122, filed on Jul. 30, 2019; and which is herein incorporated by reference in its entirety.

FIELD

Embodiments of the present disclosure generally relate to a planetary gearbox as well as associated robot joint and robot.

BACKGROUND

A gearbox is a device that uses gears and gear trains to provide speed and torque conversions from a rotating power source to another device. A conventional planetary gearbox typically comprises one or more outer gears (i.e., planet gears) rotating about a central gear (i.e., sun gear). Typically, the planet gears are mounted on a movable arm or carrier, which itself may rotate relative to the sun gear. The planetary gearbox also incorporates the use of an outer ring gear or annulus engaging with the planet gears. Planetary gears are typically classified as simple or compound planetary gears. Simple planetary gears have one sun, one ring, one carrier, and one planet set.

As a kind of special planetary gearbox, a cycloidal speed reducer (a cycloidal type planetary gearbox) is capable of relatively high ratios in compact sizes. Cycloid speed reducers have many excellent characteristics such as long work life, a broad range of transmission ratios, stable dynamic load conditions, compact design, and high efficiency. However, the manufacturing cost of the cycloid wheel profile is high. Moreover, the contact stress on the profile is significant, so the wheel profile needs high strength and wear-resisting material.

A friction based cycloid gearbox is a variant of the cycloid speed reducer. It simplifies the cycloidal profile and pins contact to static friction contact between two parts to transfer motion. The friction based cycloid gearbox eliminates the complex cycloidal profile, which can significantly reduce the manufacturing cost. However, the friction based cycloid gearbox needs elastic and wear-resisting material (e.g., rubber, TPU, TPE) for contact.

SUMMARY

To address or at least partially address the above and other potential problems, embodiments of the present disclosure provide a planetary gearbox comprising a synchronous belt.

In a first aspect, a planetary gearbox is provided. The planetary gearbox comprises a housing extending along a first axis; a first coupling member arranged on an inner circumference of the housing; an input component operable to rotate about the first axis; at least one intermediate component, each intermediate component comprising a second coupling member and adapted to be driven by the input component to rotate about a second axis offset from the first axis with the second coupling member engaging with the first coupling member; and an output component coupled to the at least one intermediate component and operable to rotate about the first axis with rotation of the at least one intermediate component, wherein at least one of the first coupling member and the second coupling member comprises a synchronous belt.

The synchronous belt is a widely used transmission with low-cost and high-strength features. By using the synchronous belt as at least of the first coupling member and the second coupling member, the assembly cost and difficulty of the planetary gearbox can be significantly reduced while overcoming the shortcomings of friction-based cycloidal gears. Furthermore, the synchronous belt can be easily replaced when it is worn out, reducing the maintenance cost and difficulty. In addition, compared to the traditional cycloid reducer, the engaging pins are no longer needed, which promotes the cycloid reducer to be further lightweight.

In some embodiments, each intermediate component further comprises a wheel for the synchronous belt to be arranged on its outer circumference, and the first coupling member comprises teeth engaging with teeth of the synchronous belt. With this arrangement, the first coupling member and the wheel can be easily manufactured by injection molding or extrusion and then the synchronous belt can be arranged on the outer circumference of the wheel. In this way, the manufacturing difficulty and cost may be further reduced.

In some embodiments, the teeth of the first coupling member are integrally formed on the inner circumference of the housing by machining, injection molding or extrusion. In this way, compared to the traditional planetary gearbox, the manufacturing difficulty and cost may be significantly reduced and the precise may be increased accordingly.

In some embodiments, the synchronous belt is arranged on the outer circumference of the wheel by interference fit, glues or rivets. As a result, manufacturing efficiency may be increased significantly.

In some embodiments, the wheel comprises teeth arranged on its outer circumference, and the synchronous belt comprises a double-side synchronous belt arranged along the outer circumference of the wheel by arranging teeth of one side of the double-side synchronous belt between the teeth of the wheel. With this arrangement, the synchronous belt can be reliably arranged on the wheel.

In some embodiments, the first coupling member comprises the synchronous belt, and each intermediate component comprises a gear engaging with the synchronous belt, and wherein a tooth profile of the gear matches with a tooth profile of the synchronous belt. In this way, the assembly and maintenance costs and difficulties may be further reduced in another way.

In some embodiments, the input component comprises an input shaft extending along the first axis. The use of the input shaft as the input component making the planetary gearbox can be used in various occasions. Thus, the versatility of the planetary gearbox is improved.

In some embodiments, the input shaft comprises at least one supporting section centered on the second axis, and each intermediate component is arranged on the respective supporting section. The use of eccentric supporting section and wheel arranged thereon to form the cycloidal type planetary gearbox can reduce the assembly difficulty.

In some embodiments, each intermediate component further comprises a plurality of through holes arranged about the second axis, and wherein the output component comprises a plurality of output pins, each output pin arranged in the respective through hole and driven by the rotation of the at least one intermediate component to cause the output component to rotate. In this way, the transmission noise can be reduced.

In second aspect, an assembly method of a planetary gearbox is provided. The assembly method comprises providing a housing extending along a first axis; arranging a first coupling member on an inner circumference of the housing; providing an input component operable to rotate about the first axis; arranging at least one intermediate component between the input component and the first coupling member, each intermediate component comprising a second coupling member and adapted to be driven by the input component to rotate about a second axis offset from the first axis with the second coupling member engaging with the first coupling member; and providing an output component coupled to the at least one intermediate component and operable to rotate about the first axis with rotation of the at least one intermediate component, wherein at least one of the first coupling member and the second coupling member comprises a synchronous belt. In this way, the assembly cost and difficulty of the first coupling member and the second coupling member can be significantly reduced while overcoming the shortcomings of friction-based cycloidal gears.

In third aspect, a robot joint comprising at least one of the above mentioned planetary gearboxes is provided.

In fourth aspect, a robot comprising at least one of the above mentioned robot joints is provided.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1:
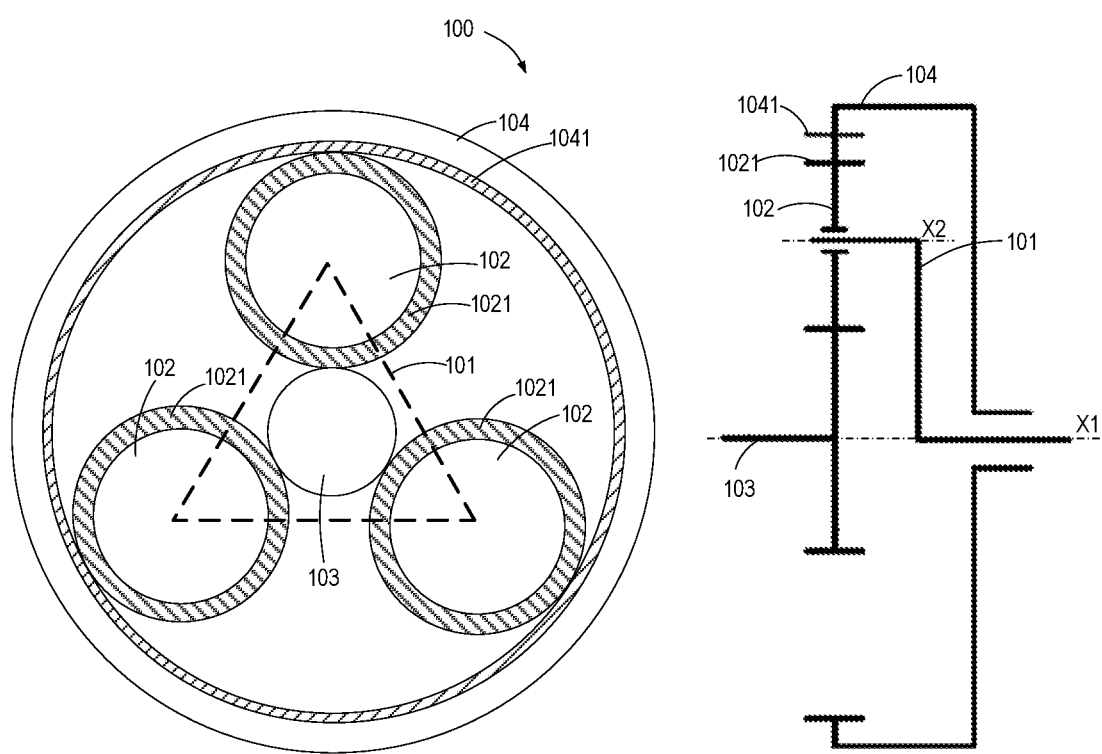
FIG. 1 shows schematic diagrams of a planetary gearbox according to embodiments of the present disclosure.

The present disclosure will now be discussed with reference to several example embodiments. It is to be understood that these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

In the conventional solutions, in order to achieve the required reduction ratio, robot joints typically employ a planetary gearbox, in particular a cycloidal type planetary gearbox (i.e., a cycloidal drive or a cycloidal speed reducer), as deceleration and transmission devices. Various components used in the planetary gearbox are typically made of metal materials, making the planetary gearboxes heavy and do not meet the lightweight requirements to robots or robot joints.

Furthermore, metal components with particularly complex shapes, such as gears, wheels or the like, typically require an extremely high cost to process. Also, the precision of the metal components machined in this way is often difficult to meet the operational requirements.

Nowadays, the development of cheap robots and small and light robots gradually becomes a development trend of the robot field. Under this trend, non-metallic robots, such as plastic robots have been developed. The use of non-metallic material such as plastic material or composite material or the like to make robots is more and more common in robot development.

Parts of plastic gearboxes, such as cycloidal wheels, are typically made by injecting molding. However, due to the requirements on the precision and the like, the precision of the mold needs to be very high. The manufacturing difficulty and cost of the parts of the gearbox are thus still great. In addition, since the contact stress between the intermeshing parts is significant, these parts are required to be made of high strength and wear resistant material, which further increases the cost.

Friction based cycloid gearboxes are variants of the cycloid speed reducer. They simplify the cycloidal profile and pins contact to static friction contact between two parts to transfer motion. The friction based cycloid gearbox eliminates the complex cycloidal profile, which can significantly reduce the manufacturing cost. However, the friction based cycloid gearbox needs elastic and wear-resisting material (e.g., rubber, TPU, TPE) for contact.

In order to solve or at least partly solve the above problems, embodiments of the present disclosure provide a planetary gearbox. Now some example embodiments will be described with reference to FIGS. 1-5.

Figure 2:
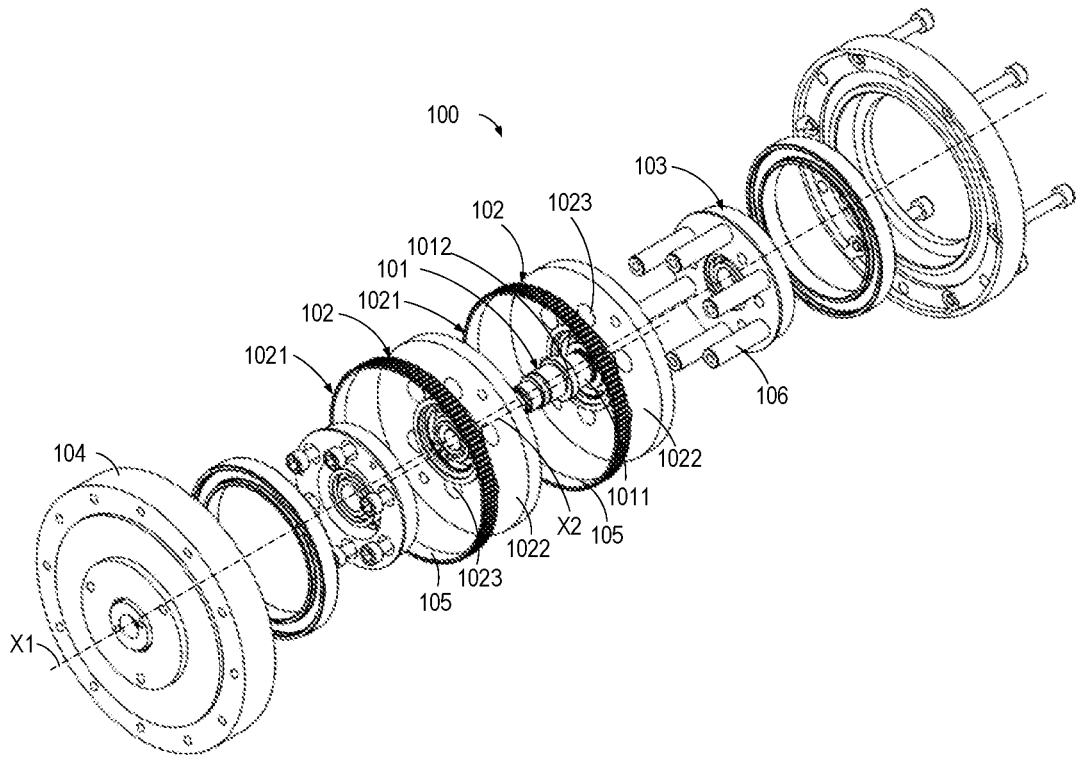
FIG. 2 shows a perspective view of a cycloidal type planetary gearbox according to embodiments of the present disclosure.

FIG. 1 shows schematic diagrams of a planetary gearbox 100 according to embodiments of the present disclosure. As shown, generally, the planetary gearbox 100 according to embodiments of the present disclosure comprises a housing 104, a first coupling member 1041, an input component 101, at least one intermediate component 102 and an output component 103. The housing 104 extends along an axis (referred to as a first axis X1 hereafter for ease of discussion) and has a cylindrical inner surface, as shown in FIGS. 1 and 2.

The first coupling member 1041 is arranged on the inner circumference of the housing 104. The input component 101 is arranged coaxially in the housing 104 and can be driven by a power source, such as a motor or the like, to rotate about the first axis X1. The intermediate component 102 is arranged in the housing 104 and coupled to the input component 101. An axis (referred to as a second axis X2) of the intermediate component 102 offsets from the first axis X1.

In some embodiments, the input component 101 may be a carrier to carry the intermediate component 102, and the intermediate component 102 may be one or more gears engaging with the first coupling member 1041 and the output component 103. That is, in those embodiments, the planetary gearbox 100 is a planetary gearbox comprising one or more outer gears (i.e., planet gears) rotating about a central gear (i.e., sun gear).

In some alternative embodiments, the input component 101 may be an input shaft with eccentric supporting section 1012 centered on the second axis X2 and the intermediate component 102 may be a wheel 1033 (for example, a cycloidal wheel) arranged on the supporting section 1012. That is, in those embodiments, the planetary gearbox 100 is a cycloidal type planetary gearbox, which will be discussed in detail below.

When the input component 101 is driven to rotate about the first axis X1, the intermediate component 102 can be driven by the input component 101 to rotate about the second axis X2 while engaging with the first coupling member 1041. In other words, the intermediate component 102 can orbit around the first axis X1 and revolve about the second axis X2. The output component 103 coupled to the intermediate component 102 thus can be actuated by the rotation of the intermediate component 102 to rotate about the first axis X1.

Compared to the conventional planetary gearbox, in the planetary gearbox 100 according to embodiments of the present disclosure, at least one of the first coupling member 1041 and the second coupling member 1021 comprises a synchronous belt.

As well known, the synchronous belt is a widely used transmission with low-cost and high-strength features. By introducing the synchronous belt as the first coupling member and/or the second coupling member, the complex process for forming tooth shapes or assembling pins is no longer needed. In this way, the manufacturing cost and difficulty of the planetary gearbox can be significantly reduced. Furthermore, the synchronous belt can be easily replaced when it is worn out, reducing the maintenance cost and difficulty.

The synchronous belt can be used in various type of planetary gearboxes, such as a planetary gearbox comprising one or more outer gears (i.e., planet gears) rotating about a central gear (i.e., sun gear) or a cycloidal type planetary gearbox. For the planetary gearbox comprising the sun and planet gears, the synchronous belt may be used to replace the teeth on the sun gear, planet gears or even the inner ring gear.

For example, in some embodiments, the sun gear or planet gears may comprise a wheel without teeth and a synchronous belt arranged on an outer circumference of the wheel. The wheel can be easily injection molded and the synchronous belt can be obtained commercially. As a result, the sun gear or planet gears may be manufactured in a cost-efficient way. Furthermore, the assembly cost and difficulty of the sun gear or planet gears can be significantly reduced. When the synchronous belt is worn out, only the synchronous belt needs to be replaced without replacing the whole sun gear or planet gears, reducing the maintenance cost and difficulty.

In some alternative embodiments, the inner ring gear may comprise a ring without teeth and a synchronous belt arranged on an inner circumference of the ring. The ring may be integrally formed on a housing of the planetary gearbox 100. Similar to the embodiments as mentioned above, assembly and manufacturing difficulties and costs may be significantly reduced.

Figure 5:
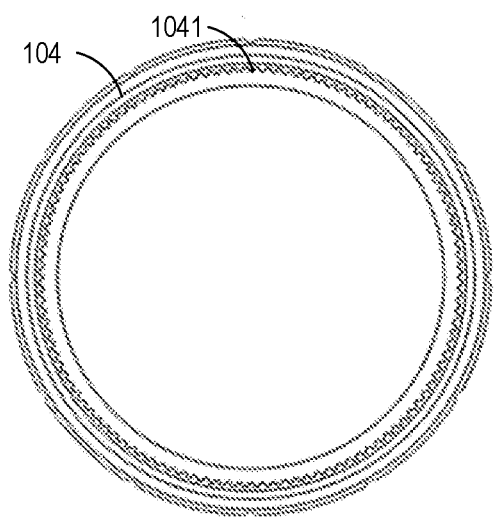
FIG. 5 shows a front view of a housing and a first coupling member of a cycloidal type planetary gearbox according to embodiments of the present disclosure.

The synchronous belt may also be used in cycloidal type planetary gearbox. For example, in some embodiments, pins formed on the inner circumference of the housing 104 may be replaced by a synchronous belt 105, as shown in FIG. 5. The synchronous belt 105 may be arranged on the inner circumference of the housing 104 by glues or rivets. Correspondingly, each intermediate component 102 (i.e., the cycloidal wheel) may comprise a gear 106, which may be formed by machining, injecting molding or extrusion, engaging with the synchronous belt.

In this way, compared to the traditional cycloidal type planetary gearbox, the engaging pins are no longer needed, which promotes the cycloidal type planetary gearbox to be further lightweight. Furthermore, compared to the friction-based cycloidal gearbox, there is gear engagement, rather than friction between the first coupling member 1041 and the second coupling member 1021, thereby overcoming the shortcomings of friction-based cycloidal gearboxes.

Figure 3:
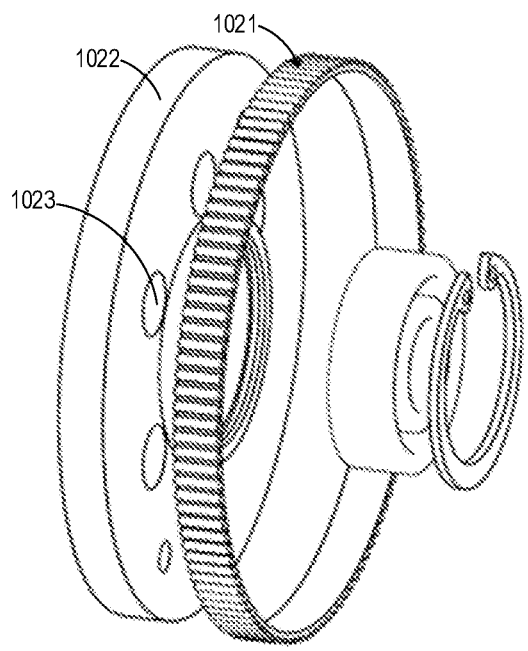
FIG. 3 shows a perspective view of an intermediate component of a cycloidal type planetary gearbox according to embodiments of the present disclosure.
Figure 4:
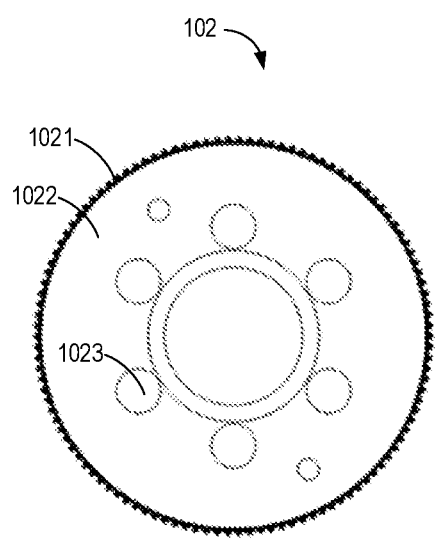
FIG. 4 shows a front view of an intermediate component of a cycloidal type planetary gearbox according to embodiments of the present disclosure.

Alternatively, in some embodiments, each intermediate component may comprise a wheel 1022 without teeth and a synchronous belt 105 arranged on an outer circumference of the wheel 1022, as shown in FIGS. 3 and 4. The synchronous belt 105 may be arranged on the outer circumference of the wheel 1022 by tensioning the synchronous belt 105. In some embodiments, an error compensation mechanism can be used to adjust the tension of the synchronous belt 105. With this arrangement, the synchronous belt can be reliably arranged on the wheel.

Correspondingly, the first coupling member 1041 (i.e., the pins of traditional cycloidal type planetary gearbox) may be replaced by or may comprise teeth engaging with the teeth of the synchronous belt 105 on the outer circumference of the wheel 1022. The first coupling member 1041 or the wheel 1022 may be integrally formed by machining, injecting molding or extrusion. In this way, similar to the embodiments where the planetary gearbox 100 comprises the sun and planet gears, the manufacturing difficulty and cost of the cycloidal type planetary gearbox may be further reduced.

The above embodiments illustrate that one of the sun gear and planet gears, or one of the pins and cycloidal wheels may comprise the synchronous belt. In some embodiments, to further extend the life of the planetary gearbox 100, it is advantageous to bring the component made of metallic material into contact with the teeth of the synchronous belt. That is, the engaging components in the planetary gearbox may alternatively comprise the synchronous belt.

For example, for the common type planetary gearbox 100 having the sun gear, planet gears and the inner ring gear, in some embodiments, the synchronous belt may be used to replace the teeth on at least one of the sun gear and the inner ring gear. In the meantime, the planet gears may be made of metal material, such as steel or aluminum. This arrangement ensures that contact occurs between metal material and the synchronous belt, thereby extending the life of the individual components as well as the entire planetary gearbox. It is to be understood that in some alternative embodiments, both of the sun gear and planet gears, or both of the pins and cycloidal wheels may comprise the synchronous belt.

Furthermore, the tooth profile of the synchronous belt 105 matches with the tooth profile of the gear engaging with the synchronous belt. That is, the synchronous belt and the gear can have any suitable tooth profile, such as an involute tooth, an arc tooth or the like, as long as the tooth profiles of the synchronous belt and gears match with each other. It is also to be understood that in addition to the tooth profile, problems such as the tooth height and the teeth number need to be considered in the design to avoid interference.

For the cycloidal type planetary gearboxes, in order to achieve the required gear ratio or reduction ratio, the teeth number of the first coupling member 1041 may be 1-4 more than the teeth number of the second coupling member 1021. In design, it is only necessary to select the appropriate synchronous belt according to the predetermined gear ratio.

In some embodiments, the synchronous belt 105 may also be a double-side synchronous belt. That is, teeth are formed on both sides of the synchronous belt 105. Correspondingly, the wheel 1022 for the synchronous belt 105 to be arranged thereon comprises teeth formed on the outer circumference. Teeth on one side of the double-side synchronous belt may be arranged between teeth of the wheel 1022. With this arrangement, the synchronous belt can be further reliably arranged on the wheel.

In some embodiments, as shown in FIG. 2, the input component 101 may comprise an input shaft extending along the first axis X1. The input shaft 1011 may be made of metal material, such as steel or the like, or non-metal material. Using metal as the material of the input shaft 1011 may ensure the strength of the transmission. Furthermore, the metal input shaft 1011 may be manufactured more easily by lathing.

The input shaft 1011 may have any suitable structure to meet various requirements. For example, in some embodiments, the input shaft 1011 may be hollow to allow the cables of the robot to pass through, facilitating the cables routing and thus making the robot joints using it more compact.

In some embodiments, at least one supporting section 1012 may be integrally or separately formed on the input shaft 1011. Each intermediate component 102 (i.e., the gear) may be arranged on the respective supporting section 1012. When the input shaft 1011 is driven to rotate about the first axis X1, the intermediate component 102 may rotate about the first axis X1 with the input shaft 1011 while engaging with the first coupling member 1041, such as the synchronous belt, causing the intermediate component 102 to rotate about the second axis X2.

In some embodiments, the intermediate component 102 may be arranged on the supporting section 1012 via one or more bearings, which ensures the relative rotation between the input shaft 1011 and the intermediate component 102.

In some embodiments, at least one intermediate component 102 may have two or more intermediate components 102. In this case, the number of the at least one supporting section 1012 may be two or more accordingly. In some embodiments, each of the two or more supporting sections 1012 may be eccentric towards different directions perpendicular to the second axis X2. This ensures the coordination of the transmission.

In some embodiments, as shown in FIGS. 2, 3 and 4, a plurality of through holes 1023 parallel to the first axis X1 may be formed on the intermediate component 102. The output component 103 may comprise a plurality of output pins 106 each arranged in the respective through hole 1023. As a result, in response to a rotation of the intermediate component 102 about the second axis X2, the output component 103 may be driven by the intermediate component 102 to rotate with the intermediate component 102. Furthermore, in some embodiments, a diameter of the output pin 106 may be slightly smaller than the through hole 1023, so that the radial motion of the intermediate component 102 about the first axis X1 is not translated to the output pins 106.

It should be understood that the above embodiments with respect to the intermediate component 102, the input component 101 and the output components 104 are merely for illustration, without suggesting any limitations as to the scope of the present disclosure. Any other suitable arrangements and structures are possible as well.

Figure 6:
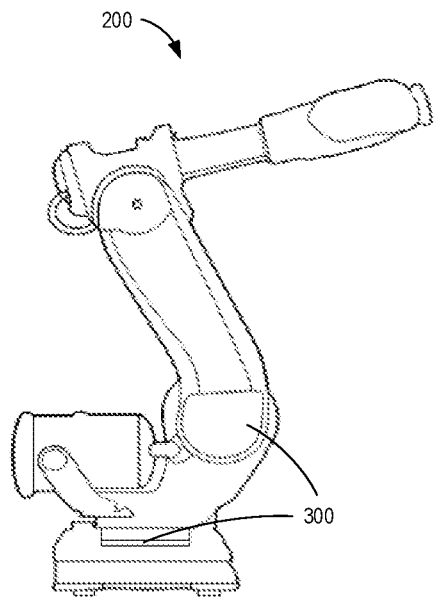
FIG. 6 shows a perspective view of a robot according to embodiments of the present disclosure.

Embodiments of the present disclosure further provide a robot joint 300, as shown in FIG. 6. The robot joint 300 comprises at least one planetary gearbox 100 as mentioned above. With the planetary gearbox 100 as mentioned above, the robot joint 300 can be efficiently designed, manufactured and maintained.

Embodiments of the present disclosure further provide a robot 200, as shown in FIG. 6. The robot 200 comprises at least one robot joint 300 as mentioned above. With the robot joint 300 as mentioned above, the robot 200 can be efficiently designed, manufactured and maintained.

Figure 7:
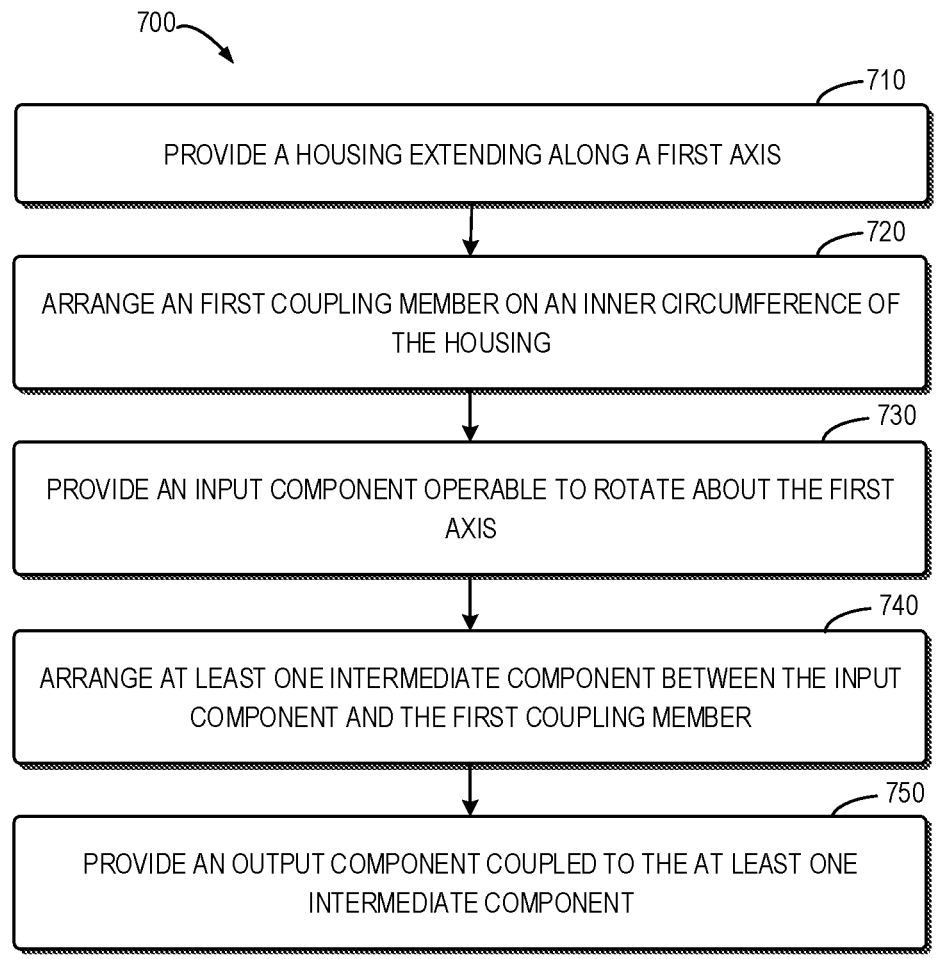
FIG. 7 shows a flowchart illustrating an assembly method of a planetary gearbox according to embodiments of the present disclosure.

Embodiments of the present disclosure further provide an assembly method of the above mentioned planetary gearbox 100. FIG. 7 shows a flowchart 700 illustrating an assembly method of a planetary gearbox. As shown, in block 710, a housing 104 extending along a first axis X1 is provided. In block 720, a first coupling member 1041 is arranged on an inner circumference of the housing 104. The first coupling member 1041 may be a synchronous belt 105. In block 730, an input component 101 is provided in the housing 104. The input component 101 can be rotated about the first axis X1 by a power source, such as a motor or the like.

In block 740, at least one intermediate component 102 is arranged between the input component 101 and the first coupling member 1041. Each intermediate component 102 comprises a second coupling member 1021 and can be driven by the input component 101 to rotate about a second axis X2 offset from the first axis X1 with the second coupling member 1021 engaging with the first coupling member 1041.

In block 750, an output component 103 coupled to the at least one intermediate component is provided. The output component 103 can rotate about the first axis X1 with rotation of the at least one intermediate component 102. By using the synchronous belt 105 as at least of the first coupling member and the second coupling member, the assembly cost and difficulty of the planetary gearbox can be significantly reduced while. Furthermore, the synchronous belt can be easily replaced when it is worn out, reducing the maintenance cost and difficulty.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A planetary gearbox, comprising:
    a housing extending along a first axis;
    a first coupling member arranged on an inner circumference of the housing;

an input component operable to rotate about the first axis;
at least one intermediate component, each intermediate component comprising a second coupling member and adapted to be driven by the input component to rotate about a second axis offset from the first axis with the second coupling member engaging with the first coupling member;
an output component coupled to the at least one intermediate component and operable to rotate about the first axis with rotation of the at least one intermediate component,
wherein at least one of the first coupling member and the second coupling member comprises a synchronous belt, and
wherein the each intermediate component further comprises a wheel for the synchronous belt to be arranged on its outer circumference, and the first coupling member comprises teeth engaging with teeth of the synchronous belt,
wherein the wheel comprises teeth arranged on its outer circumference, and the synchronous belt comprises a double-side synchronous belt arranged along the outer circumference of the wheel by arranging teeth of one side of the double-side synchronous belt between the teeth of the wheel.

2. The planetary gearbox of claim 1, wherein the teeth of the first coupling member are integrally formed on the inner circumference of the housing by machining, injection molding or extrusion.

3. A robot joint comprising at least one planetary gearbox according to claim 2.

4. A robot comprising at least one robot joint of claim 3.

5. The planetary gearbox of claim 1, wherein the synchronous belt is arranged on the outer circumference of the wheel by interference fit, glues, or rivets.

6. A robot joint comprising at least one planetary gearbox according to claim 5.

7. A robot comprising at least one robot joint of claim 6.

8. The planetary gearbox of claim 1,
wherein the first coupling member comprises the synchronous belt, and each wheel comprises a gear engaging with the synchronous belt, and
wherein a tooth profile of the gear matches with a tooth profile of the synchronous belt.

9. The planetary gearbox of claim 8, wherein the input component comprises an input shaft extending along the first axis.

10. A robot joint comprising at least one planetary gearbox according to claim 8.

11. A robot comprising at least one robot joint of claim 10.

12. The planetary gearbox of claim 1, wherein the input component comprises an input shaft extending along the first axis.

13. The planetary gearbox of claim 12, wherein the input shaft comprises at least one supporting section centered on the second axis, and each intermediate component is arranged on the respective supporting section.

14. The planetary gearbox of claim 13,
wherein each intermediate component further comprises a plurality of through holes arranged about the second axis, and
wherein the output component comprises a plurality of output pins, each output pin arranged in the respective through hole and driven by the rotation of the at least one intermediate component to cause the output component to rotate.

15. A robot joint comprising at least one planetary gearbox according to claim 14.

16. A robot comprising at least one robot joint of claim 15.

17. A robot joint comprising at least one planetary gearbox according to claim 13.

18. A robot comprising at least one robot joint of claim 17.

19. A robot joint comprising at least one planetary gearbox according to claim 7.

20. A robot comprising at least one robot joint of claim 19.

21. A robot joint comprising at least one planetary gearbox according to claim 1.

22. A robot comprising at least one robot joint of claim 21.

23. An assembly method of a planetary gearbox, comprising:
providing a housing extending along a first axis;
arranging a first coupling member on an inner circumference of the housing;
providing an input component operable to rotate about the first axis;
arranging at least one intermediate component between the input component and the first coupling member, each intermediate component comprising a second coupling member and adapted to be driven by the input component to rotate about a second axis offset from the first axis with the second coupling member engaging with the first coupling member; and
providing an output component coupled to the at least one intermediate component and operable to rotate about the first axis with rotation of the at least one intermediate component,
wherein at least one of the first coupling member and the second coupling member comprises a synchronous belt, and
wherein the each intermediate component further comprises a wheel for the synchronous belt to be arranged on its outer circumference, and the first coupling member comprises teeth engaging with teeth of the synchronous belt, wherein the wheel comprises teeth arranged on its outer circumference, and the synchronous belt comprises a double-side synchronous belt arranged along the outer circumference of the wheel by arranging teeth of one side of the double-side synchronous belt between the teeth of the wheel.

* * * * *